Aug. 2, 1932.  H. F. BICKEL  1,870,191
AIR BRAKE
Filed Oct. 9, 1930  2 Sheets-Sheet 1
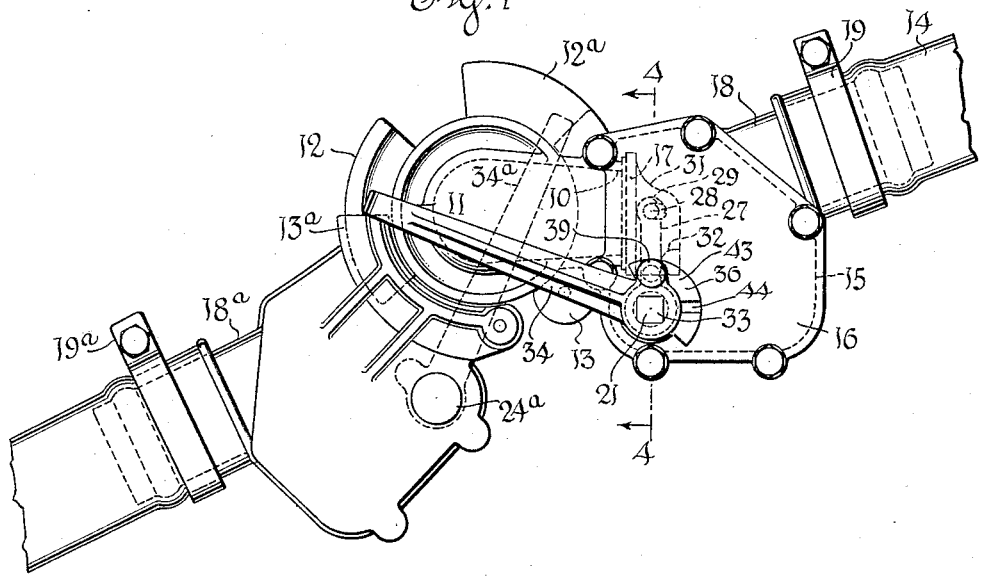

Aug. 2, 1932.  H. F. BICKEL  1,870,191
AIR BRAKE
Filed Oct. 9, 1930  2 Sheets-Sheet 2
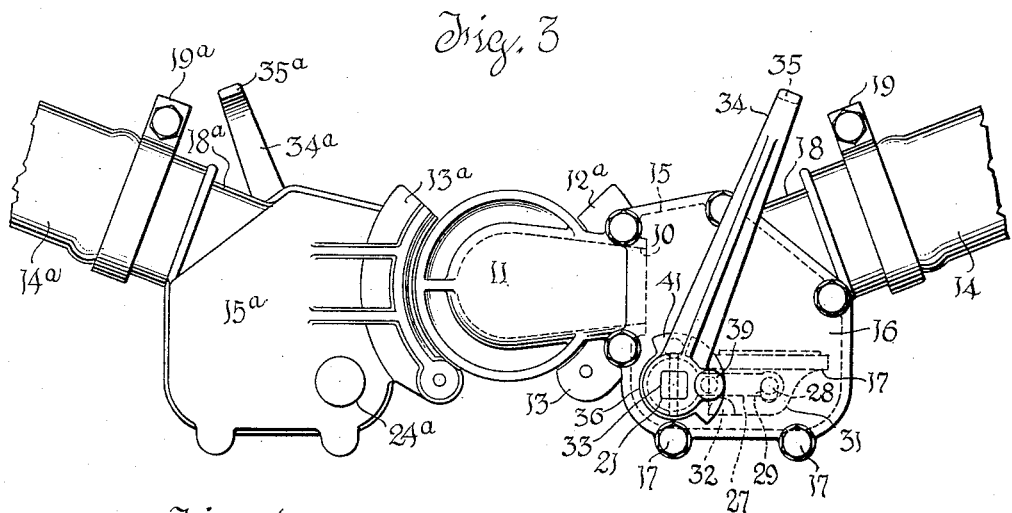
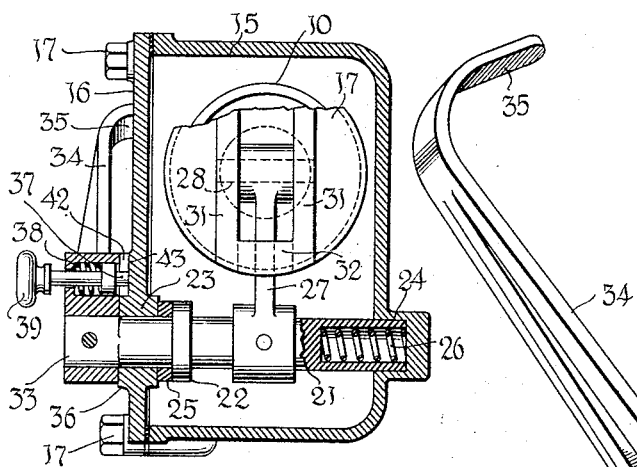
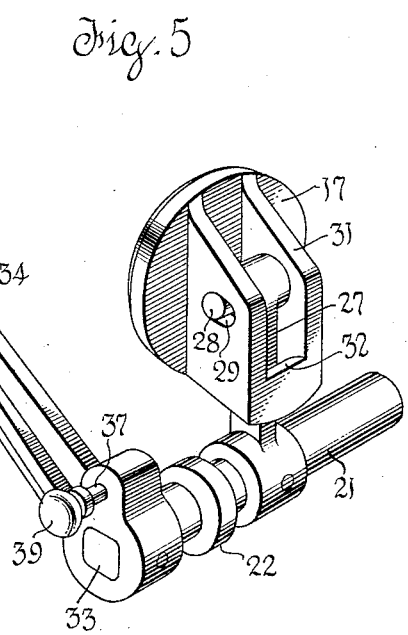
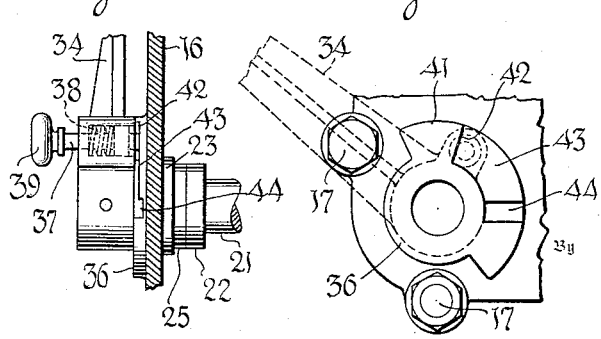
Inventor
Henry F. Bickel
Attorneys Patented Aug. 2, 1932

1,870,191

UNITED STATES PATENT OFFICE

HENRY F. BICKEL, OF PLAINFIELD, NEW JERSEY, ASSIGNOR TO THE NEW YORK AIR BRAKE COMPANY, A CORPORATION OF NEW JERSEY

AIR BRAKE

Application filed October 9, 1930. Serial No. 487,622.

This invention relates to hose couplings for use on train pipes, particularly to hose couplings for use on brake pipes of automatic air brake systems. In such systems, as customarily installed, an angle cock is mounted on the brake pipe at each end of each car, and the hose couplings are of that type which interlock by rotary motion of the couplings, one relatively to the other, about an axis transverse to the center lines of the connected hose. Serious accidents have been caused by accidental closure of angle cocks and by the failure of brakemen to open angle cocks when coupling cars, and to obviate this difficulty many efforts have been made to provide a valved hose coupling which could permit elimination of the angle cocks altogether.

In order to be commercially practicable, such a coupling must interlock with those couplings now in standard use, and must be capable of producing an emergency application of the brake by venting the train pipe, if the train breaks in two, or if the coupling is separated for any other cause. Because of this and other requirements, no valved hose coupling has yet proved satisfactory for commercial adoption.

The object of the present invention is to meet these requirements and overcome those difficulties which have heretofore prevented the adoption of valved couplings.

The present invention produces a valved coupling which may be connected to the present conventional coupling or to another valved coupling indiscriminately. The act of connecting the valved coupling to another coupling of either of the types just specified, serves to open the valve forming part of the coupling at least partially, and a detent then functions to prevent closure of the valve except upon a definite manual actuation of the detent.

The device embodies various other practical advantages, which will appear as the description proceeds. The preferred embodiment of the invention is illustrated in the accompanying drawings, in which,—

Fig. 1 shows two couplings embodying the present invention, partially connected, i. e., interlocked sufficiently to prevent leakage, and at that point in their coupling movement at which the valves commence to open.

Fig. 2 is a similar view, showing the couplings at the completion of the connecting movement, with the valves partially open.

Fig. 3 is a similar view, showing the valves fully open.

Fig. 4 is a section on the line 4—4 of Fig. 1, the figure being drawn on a slightly enlarged scale.

Fig. 5 is a perspective view of the valve and the actuating lever mechanism.

Fig. 6 is a fragmentary section showing the detent mechanism with the lever in the position of Fig. 2.

Fig. 7 is an elevation of the shouldered member with which the detent acts, the position of the valve actuating lever and the detent being indicated in dotted lines in the position of Fig. 2.

The description will be directed to the right hand one of the two couplings shown in the drawings. Similar parts of the left hand coupling will be designated by the same numerals, using the subscript $a$.

The head of the coupling, which is of conventional form, appears at 11. At its outer end it is formed with an arcuate interlocking lug 12, and diametrically opposite this it is provided with an arcuate overhanging flange 13. The arcuate lug 12 on the right hand coupling is overhung by the arcuate overhanging flange 13$^a$ of the left hand coupling, while the overhanging flange 13 of the right hand coupling overhangs the arcuate lug 12$^a$. The two coupling members are each provided on their meeting faces with the usual gaskets and are interlocked by placing the gaskets against each other and then rotating the lugs and flanges into interlocking engagement by a rotary movement about an axis transverse to the axis of the connected hose. This is a familiar operation, and need not be described in detail.

Between the coupling head 11 and the hose 14 is a valve chamber 15 formed with a removable cover 16. This cover is held in place by machine screws 17. Formed within the chamber 15 is a valve seat 10 for a poppet valve 17. It will be observed that this valve closes in the direction of flow from the hose 14 to the coupling 11. The valve chamber 15 is provided with a hose nipple 18 of usual form, and the hose is clamped on the nipple 18 by means of a conventional clamp 19.

A shaft 21 projects through a bearing 23 formed in the cover 16 and inside the cover carries a collar 22. The inner end of the shaft 21 turns in bearing 24. A gasket 25 encircles the shaft 21 between the collar 22 and the bearing 23, and a coil spring 26 mounted in a counterbore in the end of the shaft 21, urges the shaft toward the cover 16 so as to produce a tight seal between the collar 22 and the gasket 25.

Pinned to the shaft 21 is an arm 27. Fixed in the arm 27 is a transverse pin 28 which works in a slot 29 formed in the two spaced lugs 31. The lugs 31 are cast integrally with the body of the valve 17 and the arm 27 acts to support the valve 17 and to permit it limited lost motion through the freedom of the pin 28 in the slot 29.

The lugs 31 are connected by a rounded boss 32 at the rear of the arm 27. When the valve 17 is closed against the seat 10, the pin 28 is at that end of the slot 29 adjacent the valve body 17, and the arm 27 just clears the lug 32. When the shaft 21 is turned in a valve-opening direction, the arm 27 strikes the lug 32 before the pin 28 reaches the end of the slot 29. The effect is to tilt the valve 17 and free it from its seat. On further motion, the arm 27 carries the valve 17 clear of the seat 10.

That end of the shaft 21 which projects beyond the cover 16 is squared, as shown at 33 in the drawings, and carries, pinned to itself, a lever 34 which, at its outer end is curved inwardly to form a tongue 35. This tongue 35 on the right hand coupling of Fig. 1, is directly in the path of the overhanging flange 13ª on the left hand coupling when the two couplings are being connected. After the couplings have been engaged, and partially rotated, that is, after they have assumed partial engagement as indicated in Fig. 1, continued motion in a coupling direction will shift the lever 34 and open its connected valve 17. The same thing happens simultaneously in the left hand coupling of Fig. 1. Thus, by the time the couplings have been brought to the fully coupled position, shown in Fig. 2, valve 17 has been moved partially from its seat, as indicated in dotted lines in Fig. 2.

After the completion of coupling, the brakeman manually swings the lever 34 to the position shown in Fig. 3, in which the valve 17 is not only fully opened but is out of the path of air flow through the valve seat 10. In this way free flow through the coupling is assured.

It is important that the valve 17 shall not close in the event that the couplings separate either as a result of a break-in-two, or for other reason. Consequently, a detent is provided. This comprises a shouldered member 36 on the cover 16 with which coacts a detent plunger 37 mounted in the hub of the lever 34. This plunger is urged inward, that is, in engaging direction, by a coil spring 38, and may be retracted by grasping the button 39 and drawing it outward. The detent does not resist the valve opening movement of the lever 34, but in closed position of the valve, it slides on the flat surface 41 (see Fig. 7).

During the coupling operation, and just before the position illustrated in Fig. 2 is reached, the plunger snaps behind the shoulder 42. This precludes a closing movement from the position shown in Fig. 2, unless the detent be deliberately released by drawing out the button 39. If the lever be swung manually in a valve opening direction, from the position shown in Fig. 2, the detent merely slides on the flat surface 43. When the full open position, illustrated in Fig. 3, is reached, or nearly reached, the detent drops into a notch 44 which locks the valve in its wide open position until it is intentionally released by a manual withdrawal of the detent.

Assume that the couplings are disconnected and their valves 17 are closed against the seat 10. The position of the lever 34 relatively to the coupling is illustrated in Fig. 1. This permits two couplings to be engaged to the extent indicated in Fig. 1 before the levers 34 are moved. The parts are so proportioned that the lugs and their overhanging flanges on the two couplings will have been sufficiently engaged to prevent leakage, before the levers 34, 34ª are actuated by the flanges 13ª, 13. Consequently, before the valves in the couplings start to open, the couplings are adequately engaged. Continued movement of the couplings to full coupled position puts the parts in the position shown in Fig. 2, in which the valves are partially open. This opening is sufficient to insure an emergency application in case the train breaks in two, but for best operation it is desirable to secure absolutely free flow, and accordingly the brakeman swings the levers 34, 34ª to the position shown in Fig. 3, in which case the valves are carried entirely out of the path of air flow.

To uncouple the couplings, the brakeman first turns one coupling on the other in releasing direction slightly. He then releases the detents on the two levers 34, 34ª and swings these levers in a valve closing direction until the detents 39, 39ª have slightly overtraveled the shoulders 42, 42ª and consequently rest on the flat surfaces 41, 41ª. As soon as the couplings disengage, relief of pressure through the couplings will cause both of the valves 17, 17ª to close against their seats.

Various modifications in the structure above described are obviously possible, and are contemplated within the scope of the following claims.

What is claimed is:

1. The combination of a hose coupling of the type adapted to interlock with a similar coupling by rotary motion about a transverse axis; a poppet type valve and seat controlling flow from the hose outwardly through the coupling, the valve seating in the direction of such flow; a lever for actuating said valve, said lever being in the path of a portion of a mating coupling during the coupling movement, and being adapted to be moved thereby to open said valve as the couplings move to coupled position; and a releasable detent for resisting closing motion of said valve, said detent being manually operable while said coupling is coupled with said mating coupling.

2. The combination of a hose coupling of the type adapted to interlock with a similar coupling by rotary motion about a transverse axis; a poppet type valve and seat controlling flow from the hose outwardly through the coupling, the valve seating in the direction of such flow; a lever for actuating said valve, said lever being in the path of a portion of a mating coupling during the coupling operation, and being adapted to be moved thereby to open said valve partially as the couplings move to fully coupled position, said lever being manually movable to open the valve wide; and a detent for resisting closing movement of the valve.

3. The combination of a hose coupling of the type adapted to interlock with a similar coupling by rotary motion about a transverse axis; a poppet type valve and seat controlling flow from the hose outwardly through the coupling, the valve seating in the direction of such flow; a lever for actuating said valve, said lever being in the path of a portion of a mating coupling during the coupling operation, and being adapted to be moved thereby to open said valve partially as the couplings move to fully coupled position, said lever being manually movable to open the valve wide; a manually releasable detent; a spring urging the same in engaging direction; and a stepped member with which said detent coacts, to resist closing movement of the valve from wide open and said partially open positions.

4. The combination of a hose coupling of the type adapted to interlock with a similar coupling by rotary motion about a transverse axis; a poppet type valve and seat controlling flow from the hose outwardly through the coupling, the valve seating in the direction of such flow; a lever mounted for swinging movement in said coupling and having a lost motion connection with said valve and thrust engagement with said valve when the latter is in closed position, the parts being so arranged that as the lever moves to open the valve it first tilts the valve on its seat, and a second lever for actuating the first named lever, said second lever being in the path of a portion of a mating coupling during the coupling movement, and being adapted to be moved thereby, to move said first lever in a valve opening direction, as the couplings move to coupled position.

5. The combination of a hose coupling of the type adapted to interlock with a similar coupling by rotary motion about a transverse axis; a poppet type valve and seat controlling flow from the hose outwardly through the coupling, the valve seating in the direction of such flow; a lever mounted for swinging movement in said coupling and having a lost motion connection with said valve and thrust engagement with said valve when the latter is in closed position, the parts being so arranged that as the lever moves to open the valve it first tilts the valve on its seat; and a second lever for actuating the first named lever, said second lever being in the path of a portion of a mating coupling during the coupling operation, and being adapted to be moved thereby to shift the first named lever through a portion of its travel in a valve opening direction, as the couplings move to coupled position, said second lever being manually movable through the remainder of its range to shift the first lever and the connected valve to open the valve fully.

6. The combination of a hose coupling of the type adapted to interlock with a similar coupling by rotary motion about a transverse axis; a poppet type valve and seat controlling flow from the hose outwardly through the coupling, the valve seating in the direction of such flow; a lever for actuating said valve, said lever being in the path of a portion of a mating coupling during the coupling operation, and being adapted to be moved thereby to tilt said valve on its seat and then move it bodily away from said seat to a partially open position, as the couplings move to coupled position, said lever being manually movable to open the valve wide; and a detent for resisting closing movement of the valve.

7. The combination of a hose coupling of the type adapted to interlock with a similar coupling by rotary motion about a transverse axis; a poppet type valve and seat controlling flow from the hose outwardly through the coupling, the valve seating in the direction of such flow; a lever for actuating said valve, said lever being in the path of a portion of a mating coupling during the coupling operation, and being adapted to be moved thereby to tilt said valve on its seat and then move it bodily away from said seat to a partially open position, as the couplings move to coupled position, said lever being manually movable to open the valve wide; and a manually releasable detent normally serving to hold said valve against closing movement, when in the wide open, and in said partially opened positions.

8. The structure defined in claim 2, further characterized in that the coupling is formed with a chamber to receive the valve and permit it to move out of the path of flow through the seat, when the valve is wide open.

In testimony whereof I have signed my name to this specification.

HENRY F. BICKEL.